(12) United States Patent
Singer et al.

(10) Patent No.: US 11,398,734 B2
(45) Date of Patent: Jul. 26, 2022

(54) DYNAMIC ADJUSTMENT OF HOLD-UP TIME BETWEEN BATTERY PACKS

(71) Applicant: INTERNATIONAL BUSINESS MACHINES CORPORATION, Armonk, NY (US)

(72) Inventors: Noah Singer, White Plains, NY (US); John S. Werner, Fishkill, NY (US); Arkadiy O. Tsfasman, Wappingers Falls, NY (US); John Torok, Poughkeepsie, NY (US); Budy Notohardjono, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 573 days.

(21) Appl. No.: 16/454,664

(22) Filed: Jun. 27, 2019

(65) Prior Publication Data
US 2020/0412135 A1    Dec. 31, 2020

(51) Int. Cl.
*H02J 7/00* (2006.01)

(52) U.S. Cl.
CPC .......... *H02J 7/0021* (2013.01); *H02J 7/0014* (2013.01)

(58) Field of Classification Search
None
See application file for complete search history.

(56) References Cited

U.S. PATENT DOCUMENTS

| 7,091,625 | B2 | * | 8/2006 | Okusawa | H02J 7/345 |
| | | | | | 290/1 R |
| 7,489,106 | B1 | | 2/2009 | Tikhonov | |
| 8,330,418 | B2 | | 12/2012 | Furukawa | |
| 9,537,310 | B2 | | 1/2017 | Corson | |
| 9,866,050 | B2 | | 1/2018 | Brandt et al. | |
| 9,912,017 | B1 | * | 3/2018 | Kuo | H02J 7/0021 |
| 2002/0011820 | A1 | * | 1/2002 | Suzuki | H02J 7/0014 |
| | | | | | 320/132 |
| 2009/0033277 | A1 | * | 2/2009 | Ludtke | H02J 7/0071 |
| | | | | | 320/125 |

(Continued)

FOREIGN PATENT DOCUMENTS

CN    104079017 B    8/2016
JP    4615771 B2    1/2011

*Primary Examiner* — Drew A Dunn
*Assistant Examiner* — Tynese V McDaniel
(74) *Attorney, Agent, or Firm* — Cantor Colburn LLP; Tihon Poltavets

(57) ABSTRACT

Methods, systems, and computer program products for battery pack management are provided. Aspects include receiving battery pack data for two or more battery packs, the two or more battery packs comprising a first battery pack and a second battery pack, determining a target performance characteristic for the first battery pack and the second battery pack, determining a first hold up time for the first battery pack and a second hold up time for the second battery pack based at least in part on the battery pack data, determining, based on the target performance characteristic, a target hold up time from the first hold up time and the second hold up time, and determining, based on the battery pack data, a first voltage for the first battery pack and a second voltage for the second battery pack that satisfies the target hold up time.

14 Claims, 7 Drawing Sheets

(56) References Cited

U.S. PATENT DOCUMENTS

| | | | |
|---|---|---|---|
| 2009/0143929 A1* | 6/2009 | Eberhard | H02J 7/007192 903/907 |
| 2011/0074354 A1* | 3/2011 | Yano | H01M 10/441 180/65.29 |
| 2011/0076525 A1* | 3/2011 | Zhang | H01M 10/482 429/10 |
| 2011/0234164 A1* | 9/2011 | Furukawa | H02J 7/0018 320/118 |
| 2011/0241622 A1* | 10/2011 | Li | H01M 10/42 320/116 |
| 2012/0112685 A1 | 5/2012 | Hartlety et al. | |
| 2012/0293129 A1* | 11/2012 | Naghshtabrizi | H02J 7/0021 320/118 |
| 2013/0002203 A1* | 1/2013 | Kuraishi | H02J 7/0019 320/134 |
| 2013/0057218 A1* | 3/2013 | Sawayanagi | H02J 7/0021 320/118 |
| 2013/0134943 A1* | 5/2013 | Maloizel | H02J 7/0014 320/118 |
| 2013/0147434 A1* | 6/2013 | Boehm | H01M 10/482 320/118 |
| 2013/0176001 A1* | 7/2013 | Hofmann | H01M 10/441 320/162 |
| 2014/0114594 A1* | 4/2014 | Schaefer | B60L 58/22 702/63 |
| 2014/0167657 A1* | 6/2014 | Nishikawa | B60L 15/2009 320/134 |
| 2014/0266221 A1* | 9/2014 | Baughman | G01R 31/3835 324/426 |
| 2014/0292084 A1 | 10/2014 | Corson | |
| 2015/0042263 A1 | 2/2015 | Schmidt et al. | |
| 2015/0048796 A1* | 2/2015 | Sherstyuk | H01M 10/425 320/129 |
| 2015/0239365 A1* | 8/2015 | Hyde | B60L 58/26 701/2 |
| 2015/0244190 A1* | 8/2015 | Yamamoto | H02J 7/0016 320/126 |
| 2015/0295425 A1* | 10/2015 | Bryngelsson | H02J 7/0016 320/126 |
| 2015/0380952 A1 | 12/2015 | Brandt et al. | |
| 2016/0336767 A1* | 11/2016 | Zane | H02J 7/0048 |
| 2017/0141588 A1* | 5/2017 | Kim | H02J 7/0018 |
| 2017/0229876 A1* | 8/2017 | Jhunjhunwala | B60L 58/13 |
| 2017/0353042 A1 | 12/2017 | Liu | |
| 2018/0154794 A1* | 6/2018 | Hsiao | B60L 7/16 |
| 2019/0148964 A1* | 5/2019 | Fasching | H01M 10/44 320/139 |
| 2019/0267815 A1* | 8/2019 | Hidaka | H02J 7/0016 |
| 2020/0099110 A1* | 3/2020 | Lin | H02J 7/0019 |
| 2020/0099233 A1* | 3/2020 | Hollweg | B60L 58/12 |
| 2020/0280108 A1* | 9/2020 | Tomar | B60L 53/63 |
| 2020/0358303 A1* | 11/2020 | Yang | G01R 31/396 |
| 2020/0412135 A1* | 12/2020 | Singer | H02J 7/0021 |
| 2021/0086661 A1* | 3/2021 | Furukawa | H01M 10/441 |
| 2021/0098995 A1* | 4/2021 | Zhong | H01M 10/425 |
| 2021/0168964 A1* | 6/2021 | Nakaya | H05K 7/1492 |
| 2021/0281081 A1* | 9/2021 | Singer | G01R 31/367 |

\* cited by examiner

US 11,398,734 B2

DYNAMIC ADJUSTMENT OF HOLD-UP TIME BETWEEN BATTERY PACKS

BACKGROUND

The present invention generally relates to battery backup systems, and more specifically, to dynamic adjustment of hold-up time between battery packs in a battery backup system.

Data operations (data processing, management, analysis, etc.) have become a key component of modern business, in industries such as banking, online retail, insurance, and airlines. Often, these data operations are critical to the operation of the company and any downtime can lead to losses of millions or billions of dollars in revenue. Businesses use large information technology (IT) equipment (such as, but not limited to, a mainframe) to perform these data operations. Since the operations being performed are mission critical, the IT equipment itself is mission critical and must not experience downtime.

Large IT equipment in a data center environment is run off of main power lines. In the event of a loss of power from the main line, backup generators will turn on to continue providing power to the data center and to all of the IT equipment contained within. However, there can be a lag time between the loss of the main line power and the start of the generators, during which the IT equipment will not be functioning. For mission critical applications and IT equipment, this lag time is unacceptable so mission critical IT equipment will typically have an inline battery backup system. The inline battery backup system is used to ensure that the IT equipment always has a source of power, even during the time between a failure of the main line power and the start of the generator (typically 30 seconds or less).

SUMMARY

Embodiments of the present invention are directed to a method for battery pack management. A non-limiting example of the method includes receiving battery pack data for two or more battery packs, the two or more battery packs comprising a first battery pack and a second battery pack, determining a target performance characteristic for the first battery pack and the second battery pack, determining a first hold up time for the first battery pack and a second hold up time for the second battery pack based at least in part on the battery pack data, determining, based on the target performance characteristic, a target hold up time from the first hold up time and the second hold up time, and determining, based on the battery pack data, a first voltage for the first battery pack and a second voltage for the second battery pack that satisfies the target hold up time.

Embodiments of the present invention are directed to a system for battery pack management. A non-limiting example of the system includes a processor communicatively coupled to a memory, the processor configured to perform receiving battery pack data for two or more battery packs, the two or more battery packs comprising a first battery pack and a second battery pack, determining a target performance characteristic for the first battery pack and the second battery pack, determining a first hold up time for the first battery pack and a second hold up time for the second battery pack based at least in part on the battery pack data, determining, based on the target performance characteristic, a target hold up time from the first hold up time and the second hold up time, and determining, based on the battery pack data, a first voltage for the first battery pack and a second voltage for the second battery pack that satisfies the target hold up time.

Embodiments of the invention are directed to a computer program product for battery pack management, the computer program product comprising a non-transitory computer readable storage medium having program instructions embodied therewith. The program instructions are executable by a processor to cause the processor to perform a method. A non-limiting example of the method includes receiving battery pack data for two or more battery packs, the two or more battery packs comprising a first battery pack and a second battery pack, determining a target performance characteristic for the first battery pack and the second battery pack, determining a first hold up time for the first battery pack and a second hold up time for the second battery pack based at least in part on the battery pack data, determining, based on the target performance characteristic, a target hold up time from the first hold up time and the second hold up time, and determining, based on the battery pack data, a first voltage for the first battery pack and a second voltage for the second battery pack that satisfies the target hold up time.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Figure 1:
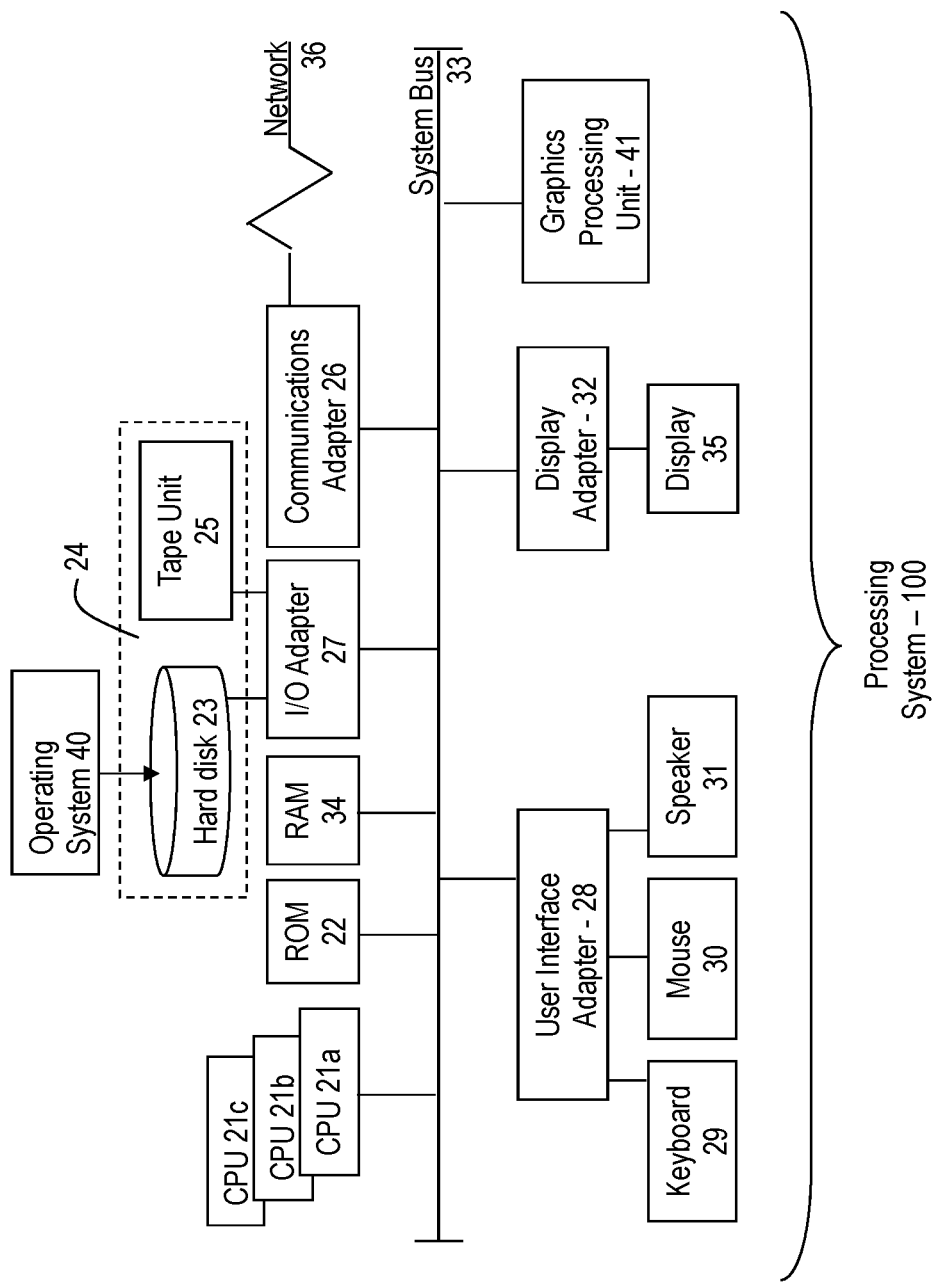
FIG. 1 depicts a block diagram of a computer system for use in implementing one or more embodiments of the present invention.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments of the present invention, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

It is to be understood that the block diagram of FIG. 1 is not intended to indicate that the processing system 100 is to include all of the components shown in FIG. 1. Rather, the processing system 100 can include fewer or additional components not illustrated in FIG. 1 (e.g., additional memory components, embedded controllers, modules, additional network interfaces, etc.).

Turning now to an overview of technologies that are more specifically relevant to aspects of the invention, many electronic systems (e.g., IT, medical, security, etc.) often use high-voltages inside the power assemblies for efficiency purposes. When the main line goes down, the battery backup needs to provide high-voltage power to the power assemblies (i.e., inside the regulator/converter assembly) to keep the system running. In order for the battery backup to provide the high-voltage power necessary to keep the system up and running, a large number of battery cells (e.g., lead acid, lithium ion, etc.) need to be connected in series. The reason for this is that individual cell voltages can be quite low (e.g., ~1-4 V per cell depending on chemistry) while the battery backup needs to provide high-voltages (e.g., ~200-400 V).

These battery backups, typically, utilize rechargeable battery cells which can have small variations in performance due to, for example, non-uniform thermal stress, impedance deltas, cell capacity mismatch, and chemical variations. When multiple battery cells are coupled together to form a battery pack, these aforementioned variations can be amplified causing performance issues and battery life issues, for example. Battery backup systems, which are designed to provide hold-up to a load for an electronic system, will typically discharge until the weakest battery pack in the battery backup system has run out of capacity or can no longer support its portion of the electronic load for the electronic system. This can lead to inefficiencies because the other battery packs may still have remaining capacity that remains unused. Alternatively, for battery backups which are designed to discharge until there is no remaining capacity in any of the available battery packs, there is the potential for the weaker battery packs to become permanently damaged and degraded by other discharge.

Turning now to an overview of the aspects of the invention, one or more embodiments of the invention address the above-described shortcomings of the prior art by providing a battery management system that can monitor the cell voltages and cell temperatures along with communication between cells and battery packs to optimize either the performance of the battery packs or the life of the battery packs. This optimization can be done by adjusting the state of charge (SoC) of the battery packs at a system level for the battery backup system.

Figure 2:
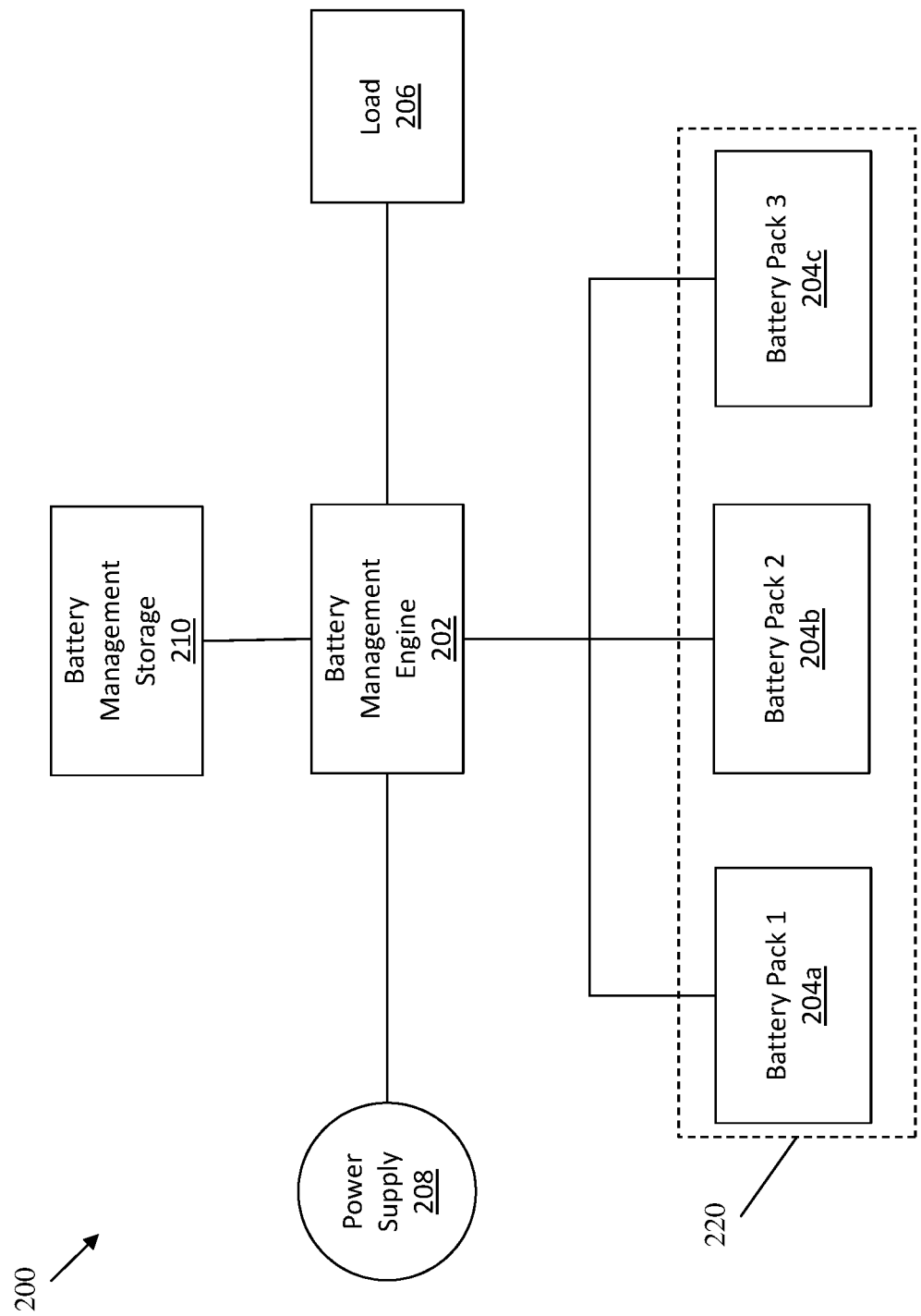
FIG. 2 depicts a block diagram of a battery management system according to one or more embodiments of the present invention.

Turning now to a more detailed description of aspects of the present invention, FIG. 2 depicts a block diagram of a battery management system 200 according to one or more embodiments of the present invention. The battery management system 200 includes a battery management engine 202 along with a set 220 of battery packs 204a, 204b, 204c and a battery management storage 210. The battery management engine 202 is coupled to the set 220 of battery packs 204a, 204b, 204c and can utilize one or more sensors to determine a parameter associated with each of the battery packs 204a, 204b, 204c. The parameter can include voltage measurements across the battery packs and/or individual battery cells within the battery packs, current measurements through the battery packs and/or individual battery cells within the battery packs, a temperature measurement, and the like. These parameters or measurements can be stored in the battery management storage 210. In one or more embodiments, the battery management storage 210 can be any type of storage or memory.

In one or more embodiments of the present invention, the battery management engine 202 can couple to a load 206 to provide the battery discharge in the event of a power outage. In addition, the battery management engine 202 couples to a power supply 208 to allow for charging of the battery packs 204a, 204b, 204c. In one or more embodiments of the present invention, any of the functionalities of the battery management engine 202 can be partially or entirely implemented in hardware and/or in processors such as CPUs 21a, 21b, 21c . . . . In some embodiments of the present invention, the functionalities of the battery management engine 202 can be implemented with logic, wherein the logic, as referred to herein, can include any suitable hardware (e.g., a processor, among others), software (e.g., an application, among others), firmware, or any suitable combination of hardware, software, and firmware.

In one or more embodiments of the present invention, the battery management engine 202 provides optimization for the performance of the set 220 of the battery packs 204a, 204b, 204c or for the operation life of the battery packs 204a, 204b, 204c. In one or more embodiments of the invention, the performance of the battery management system 200 can be optimized by focusing on the hold-up time for the battery packs 204a, 204b, 204c. Typically, battery cell balancing is accomplished by charging up all the battery cells to a desired voltage level, then bleeding off other cells through resistors to the level of the weakest cell. In doing so, this action does not optimize the charging activity and wastes energy and needlessly adds mini-discharge cycles which affect performance. Aspects of the present invention focus on the battery pack level and not the cell level which exploits the awareness of previous discharges to determine and optimize battery pack strength. In one or more embodiments, the charging level that the battery packs are being charged to (i.e., the desired level) is not 100% SoC. Because the issue that if the strongest battery pack in a set of battery packs is charged to 100% SoC, any of the weaker battery packs will not be able to reach that level. The reason for selecting a desired SoC less than 100% (e.g., 60%) is to extend the lifetime of the battery pack. The strongest battery pack is charged up to the desired level (e.g., 60% SoC) while the weaker packs continue to charge until they reach a level that results in the same hold-up time as the strongest pack. In doing so, no energy is wasted as with traditional battery cell balancing.

Hold-up time refers to the amount of time (typically measured in seconds) that a battery backup can provide sufficient power to a load when there is a power supply 208 failure, such as a power outage. In these scenarios, the hold-up time is generally long enough for a generator backup system to power up which can be several seconds or minutes. During this time, the battery management system 200 provides the required voltage so that the load 206, typically servers and other large equipment, does not go without power. When performance optimization is the focus of the battery management system 200, the battery packs 204a, 204b, 204c are charged to a voltage (and corresponding state of charge) that provides a specific hold-up time. This specific hold-up time for performance optimization is determined by analyzing the hold-up time for each of the battery packs 204a, 204b, 204c to identify which has the highest hold-up time (i.e., strongest battery pack) within the set 220 of battery packs 204a, 204b, 204c. The stack voltages of the weaker battery packs are adjusted upwards (by increasing internal cell voltages) to match the hold-up time of this identified strongest battery pack. This allows the battery management system 200 to provide the hold-up time of the strongest battery pack rather than being limited by the weakest battery pack in a system.

For example, consider the following characteristics of the battery packs 204a, 204b, 204c. Battery pack 1 204a at a 30V stack voltage has a hold-up time of 110 seconds. As previously mentioned herein, this 30V stack voltage may be charged to a SoC of less than 100% (e.g., 60%, 75%, etc.) which is set as the desired level. This desired level, according to some embodiments, can be selected by the manufacturer of the battery pack. In this example, if the desired level SoC is 75%, the charge at 100% SoC would be 40V. However, setting the desired level to 100% SoC would affect the lifetime of the battery packs. Continuing with the example, battery pack 2 204b at a 30V stack voltage has a hold-up time of 90 seconds. And battery pack 3 204c at a 30V stack voltage has a hold-up time of 100 seconds. These stack voltage and hold-up times can be determined based on historical discharging hold-up times determined by sensing circuits on the battery packs and stored in the battery management storage 210. In the above example, the battery management engine 202 can optimize for performance by determining the highest hold-up time (i.e., Battery pack 1 204a with 110 seconds of hold-up). The other battery packs 204b, 204c are charged to a higher stack voltage to get the same hold-up time of 110 seconds. The stack voltages can be charged to 38V for battery pack 2 204b and 34V for battery back 3 204c. Note, the number of battery packs and the stack voltages and hold-up times are selected arbitrarily for illustrative ease. The battery management system 200 can work with any number of battery packs with any stack voltage and hold up time. In one or more embodiments, the stack voltage can be adjusted utilizing cell balancing circuits that can be inside the battery packs which balance the cell voltages of each individual battery cell in the battery pack.

In one or more embodiments of the present invention, the battery system 200 can be utilized to optimize the life of the battery packs 204a, 204b, and 204c. In this case, the stack voltages of the stronger battery packs can be adjusted downwards (by decreasing internal cell voltages) to match the hold-up time of the weakest battery pack. This results in an increase in the life of the stronger battery packs by allowing them to sit at a lower state of charge while providing equal capacity from each battery pack (i.e., no wasted capacity). For example, consider the following characteristics of the battery packs 204a, 204b, 204c. Battery pack 1 204a at a 30V stack voltage has a hold-up time of 110 seconds. Battery pack 2 204b at a 30V stack voltage has a hold-up time of 90 seconds, and battery pack 3 204c at a 30V stack voltage has a hold-up time of 100 seconds. These stack voltage and hold-up times can be determined based on historical discharging hold-up times determined by sensing circuits on the battery packs and stored in the battery management storage 210. In the above example, the battery management engine 202 can optimize for the life of the battery packs by adjusting the stack voltages of battery pack 1 204a and battery pack 3 204c. For battery pack 1 204a, the stack voltage is adjusted downwards to 24V to have a hold-up time of 90 seconds. For battery pack 3 204c, the stack voltage is adjusted downwards to 27V to have a hold-up time of 90 seconds as well. A typical failure criterion in the industry defines failure as the time when the battery pack is reduced to 80% of the initial capacity. So by reducing the stack voltages, the life of the battery packs can be extended.

Figure 3:
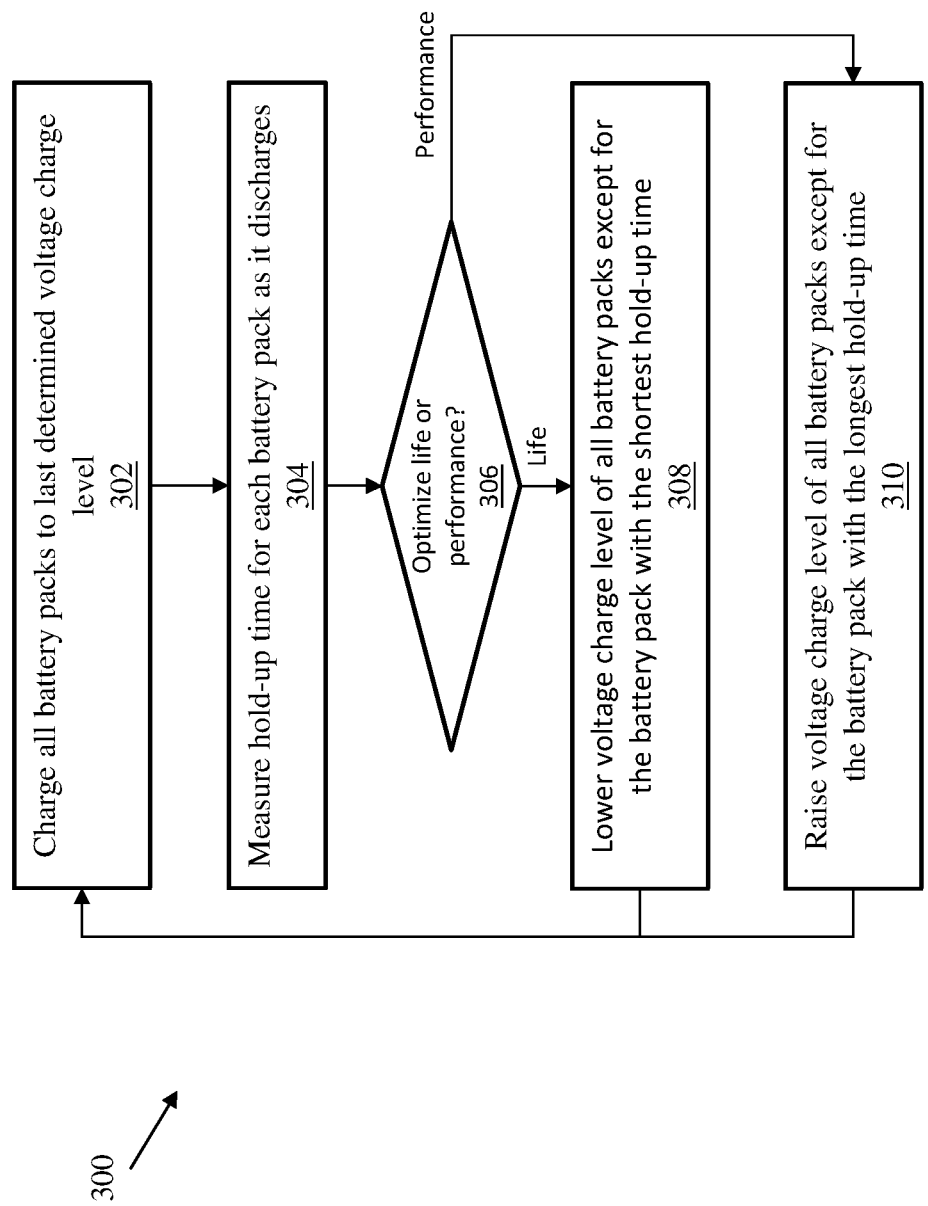
FIG. 3 depicts a flow diagram of a method for adjustment of hold-up times for battery packs according to one or more embodiments of the present invention.

FIG. 3 depicts a flow diagram of a method for adjustment of hold-up times for battery packs according to one or more embodiments of the present invention. The method 300 includes charging all battery packs to the last determined voltage level, as shown in process block 302. The last determined voltage level can be historical data stored in the battery management storage 210 and utilized to charge each battery pack to the voltage through the battery management engine 202 by the power supply 208. For example, if the battery packs are on their $250^{th}$ charge cycle, the battery packs will charge to the last calculated voltage which may have been from the $249^{th}$ cycle, the $245^{th}$ cycle, or $240^{th}$ cycle depending on the frequency at which the battery management engine 202 or a user sets the calculation to be performed. With respect to charge cycles, during normal system operation (where there is no power outage), the battery management engine 202 will periodically utilize power from the charged battery pack. This is done because batteries will degrade over time without regular use (i.e., the 250th charge cycle does not mean that there have been 250 power outages). Data about hold-up time can be extracted during these discharge cycles to create the capacity curves shown in FIG. 5. A voltage specification from a design point or datasheet may be used as an initial or first determined charge level voltage. The method 300 continues, at block 304, where the hold-up time is measured for each battery pack as it discharges.

At decision block 306, the method 300 determines whether the optimization is for performance or for the life of the battery packs in the system. This optimization can be determined by a user of the battery management system 200 or can be made, at least initially, by a product developer for the battery management system 200. If it is determined that the life of the battery packs are to be optimized, the method 300 continues to block 308 where the voltage charge levels of all battery packs, except for the battery pack with the shortest hold-up time, are lowered. If it is determined (at block 306) that the performance of the battery packs are to be optimized, the method 300 continues to block 310 where the voltage charge levels of all battery packs, except for the battery pack with the longest hold-up time, are raised.

Additional processes may also be included. It should be understood that the processes depicted in FIG. 3 represent illustrations, and that other processes may be added or existing processes may be removed, modified, or rearranged without departing from the scope and spirit of the present disclosure.

Figure 4:
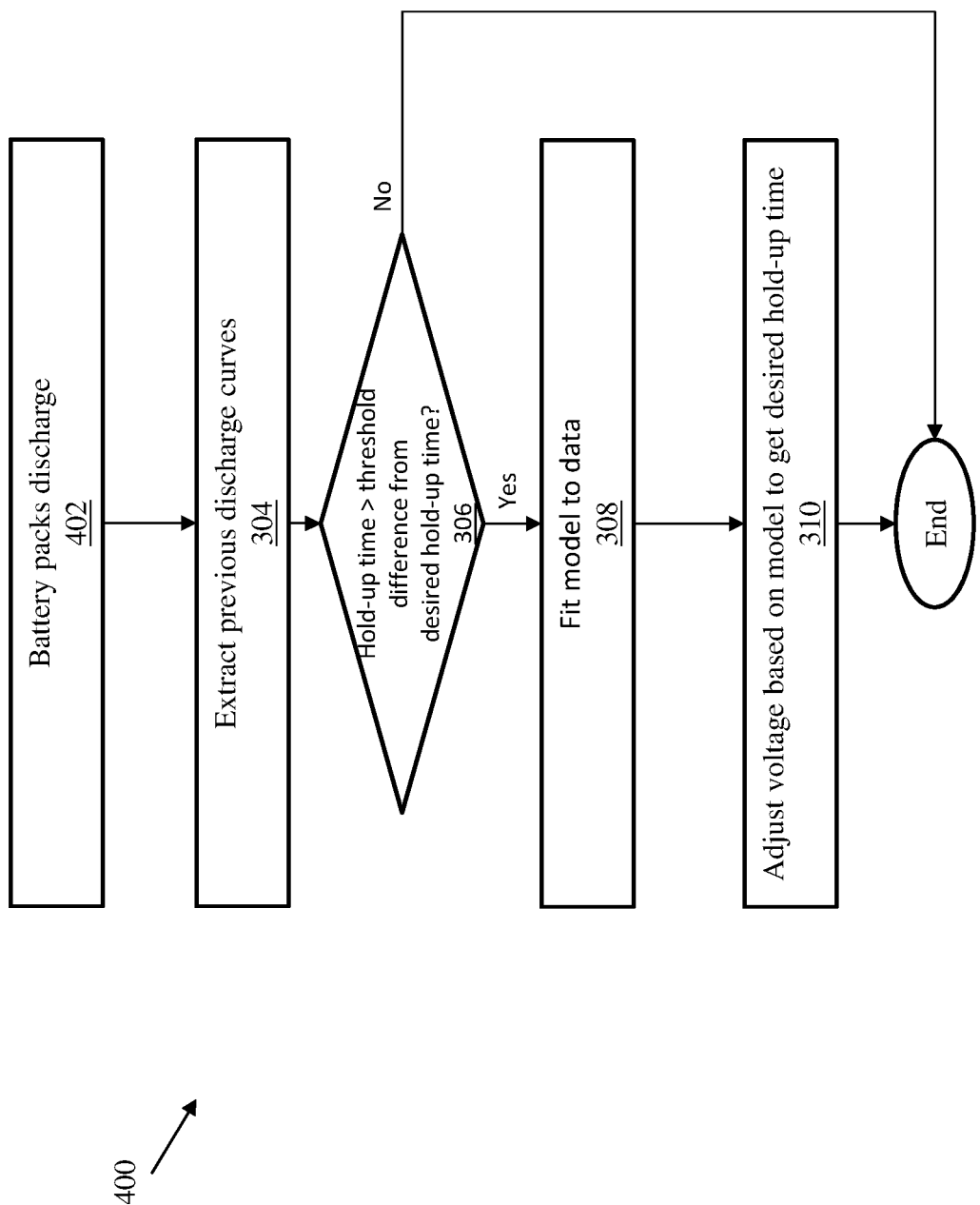
FIG. 4 depicts a flow diagram of a method for calculating the hold-up times for battery packs according to one or more embodiments of the present invention.

FIG. 4 depicts a flow diagram of a method for calculating hold-up times for a battery packs according to one or more embodiments of the invention. The method 400 begins at block 402 by discharging the battery packs 204a-204c which can be charged to the same or different voltages based on any prior runs. Initial generic cell data can be generated from testing of many cells prior to use. Then, at block 404, the method 400 continues by extracting, from the battery management engine 202, previous discharge curves for all battery packs in the system 200. In one or more embodiments, discharge curves refer to data associated with the voltage level of a battery pack in reference to time during a discharge. Discharge curves can be illustrated by a graph where voltage is in the y-axis and time (typically, measured in minutes) is in the x-axis. A discharge curve can be determined (or measured) by the battery management engine 202 during each discharge event by a battery pack or can be measured according to any measurement frequency. At decision block 406, the method 400 determines if the hold-up time for any of the battery packs is greater than a threshold difference (e.g., +/−2%) from the desired hold-up time. The desired hold-up time may be chosen based on the strongest battery pack if optimizing battery performance or based on the weakest battery pack if optimizing for battery life. In some embodiments, the desired hold-up time may be selected based on product requirements. At decision block 406, if the hold-up time for all of the battery packs was within the desired hold-up time, it is determined that the voltage from previous iterations of the method 400 remain sufficient and the method 400 can end. However, if, at block 406, it is determined that the hold-up time for all of the battery packs was greater than a threshold difference of the desired hold-up time, the method 400 continues to block 408 where a model is fit to battery pack specific data that was generated from the previous discharges of the battery pack in the field. In one or more embodiments, the battery management engine 202 will periodically utilize power from the charged battery pack. This is done because batteries will degrade over time without regular use. Data about hold-up time can be extracted during these discharge cycles to create the discharge curves. And at block 410, the method 400 continues where the voltage for the battery pack is adjusted such that the desired hold-up time is met. In one or more embodiments of the invention, the method 400 can be repeated as desired to reach a specific tolerance range around hold-up time. The difference between desired hold-up time and actual hold up time may decrease for each iteration.

Additional processes may also be included. It should be understood that the processes depicted in FIG. 4 represent illustrations, and that other processes may be added or existing processes may be removed, modified, or rearranged without departing from the scope and spirit of the present disclosure.

Figure 5:
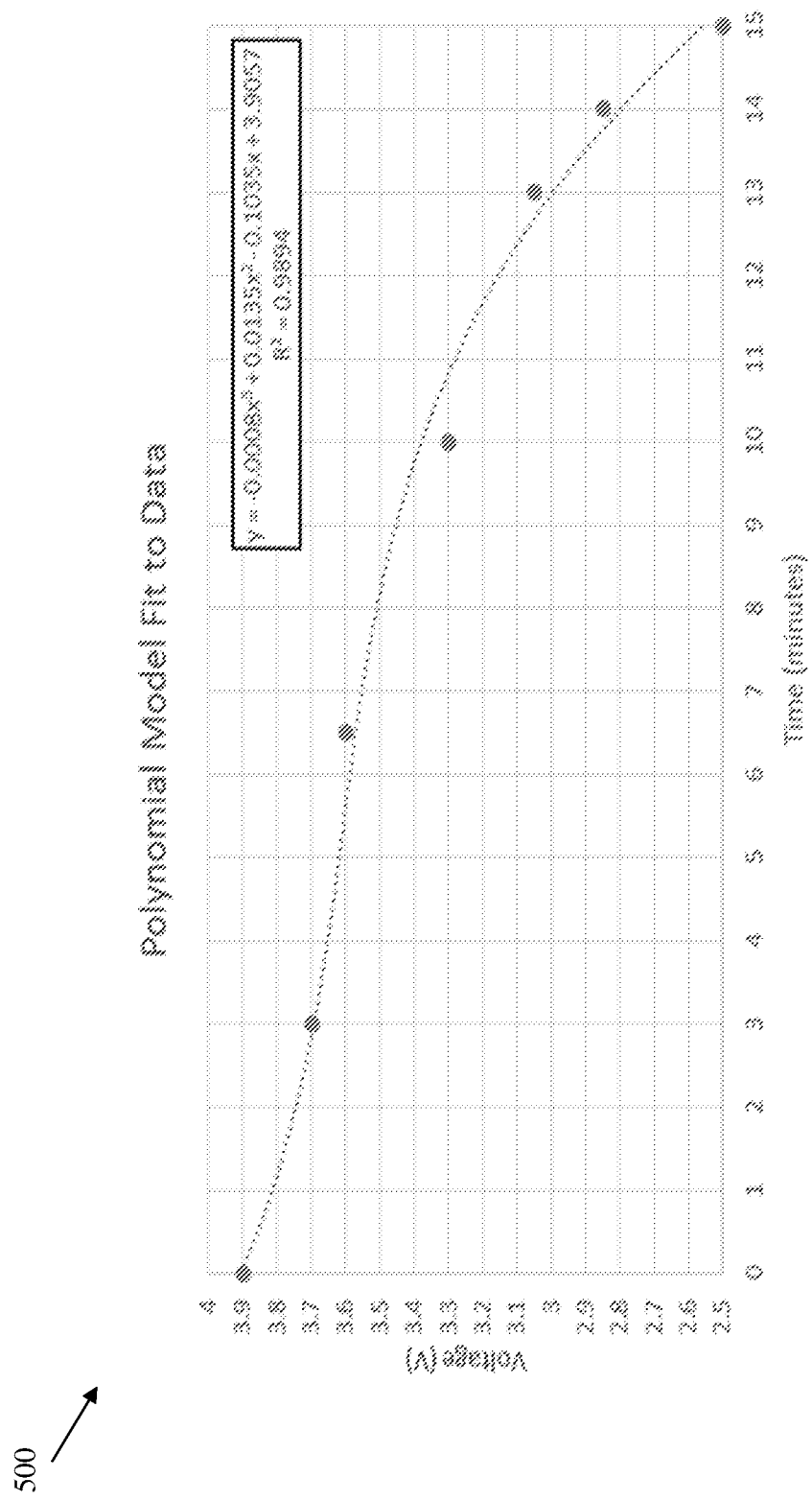
FIG. 5 depicts graphical representation of a model created to fit data generated from discharging a battery pack in the field according to one or more embodiments of the invention.

FIG. 5 depicts graphical representation of a model created to fit data generated from discharging a battery pack in the field according to one or more embodiments of the invention. In one or more embodiments, the model 400 is fit to performance data generated and plotted on the voltage graph where the y-axis is the voltage of a battery pack and the x-axis is the time of discharge measured in minutes. The illustrated model 400 includes data from a specific battery pack where it is observed that starting a discharge at 3.5V yields seven (7) minutes of hold-up time (i.e., 8 minutes at 3.5V to 15 minutes at 2.5V), which limits the overall performance of the battery management system 200. An additional minute of hold-up time is needed to reach a desired 8 minutes of hold up time. A curve is fitted to the data (which in this example is a $3^{rd}$ order polynomial). Using the example curve, it can be determined by the battery management engine 202 that there is a 0.06V voltage difference to increase hold-up time from 7 minutes to the desired 8 minutes. In one or more embodiments, the model can be created using an average of recent discharge curves from previous discharge cycles (e.g., out of 250 discharge cycles, an average of the last 10 can be used to create the model described in FIG. 5. This is done to account for normal battery pack degradation over time.

Figure 6:
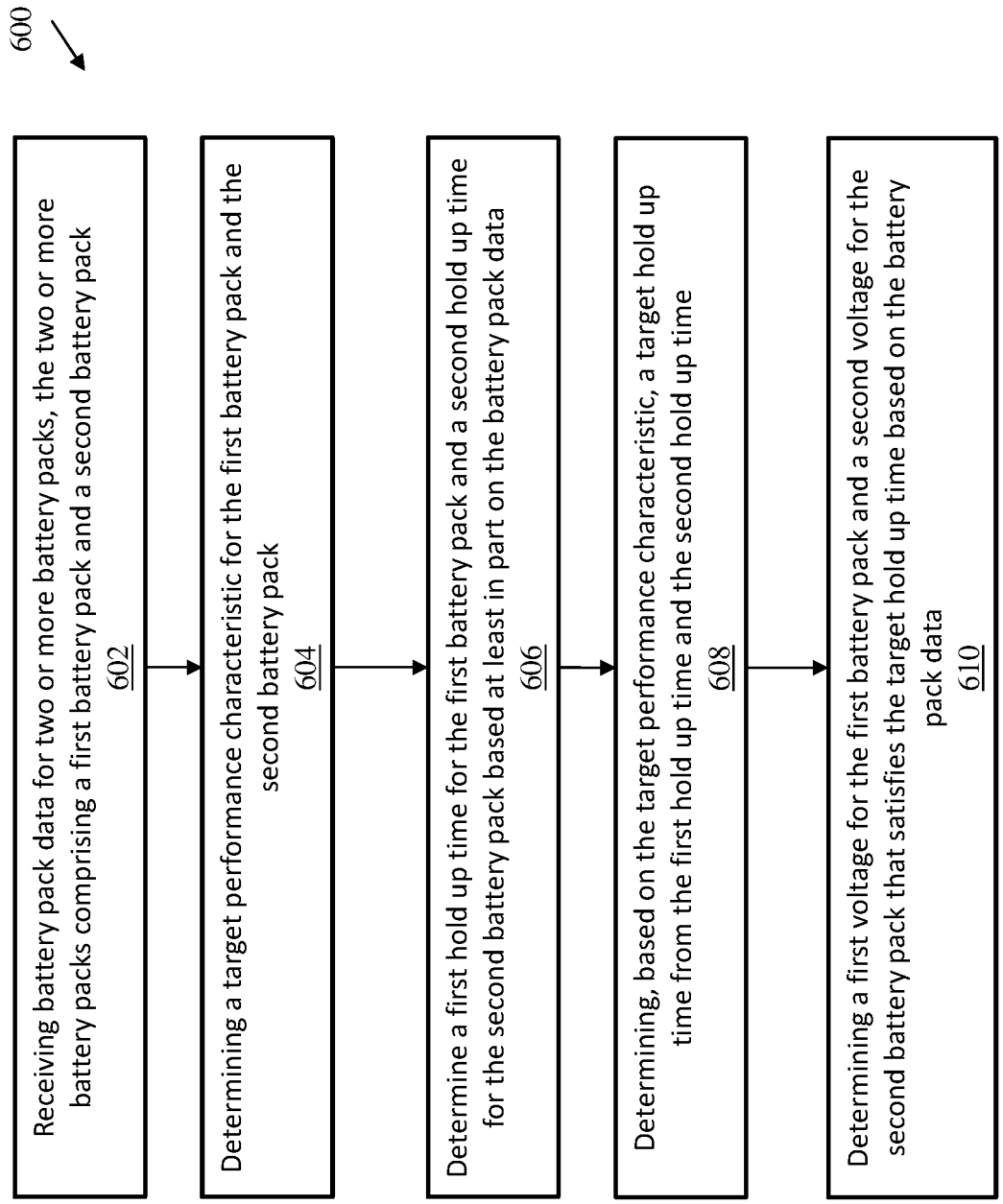
FIG. 6 depicts a flow diagram of a method for battery pack management according to one or more embodiments of the present invention.

FIG. 6 depicts a flow diagram of a method for battery pack management according to one or more embodiments of the present invention. The method 600 includes receiving battery pack data for two or more battery packs, the two or more battery packs including a first battery pack and a second battery pack, as shown in block 602. Battery packs refer to a collection of battery cells which can be connected in series, parallel, or a combination to provide a voltage for use in the battery backup system. The battery pack data can include data related to hold-up times for the first battery pack and the second battery pack. In addition, the battery pack data can include historical discharge curves for each battery pack which can be utilized to determine an associated voltage for a specific hold up time. At block 604, the method 600 includes determining a target performance characteristic for the first battery pack and the second battery pack. The target performance characteristic can be for performance optimization or for lifetime optimization of the battery packs. This characteristic can be based on a user defined criteria or can be set by a technician during the manufacturing of the battery backup system. The method 600, at block 606, includes determining a first hold up time for the first battery back and a second hold up time for the second battery pack based at least in part on the battery pack data. Also, at block 608, the method 600 includes determining, based on the target performance characteristic, a target hold up time from the first hold up time and the second hold up time. And at block 610, the method 600 includes determining a first voltage for the first battery pack and a second voltage for the second battery pack that satisfies the target hold up time based on the battery pack data. The determining can be done based on the target performance criteria. Alternatively, or in addition to meeting target performance criteria, the hold-up time of a first battery pack can be adjusted to match the hold-up time of a second battery pack. For performance optimization, the target hold-up time is the longest hold-up time between the battery packs. For lifetime optimization, the target hold-up time is the shortest hold-up time between the battery packs that meets the required voltage for the attached load in the backup system.

Additional processes may also be included. It should be understood that the processes depicted in FIG. 6 represent illustrations, and that other processes may be added or existing processes may be removed, modified, or rearranged without departing from the scope and spirit of the present disclosure.

Figure 7:
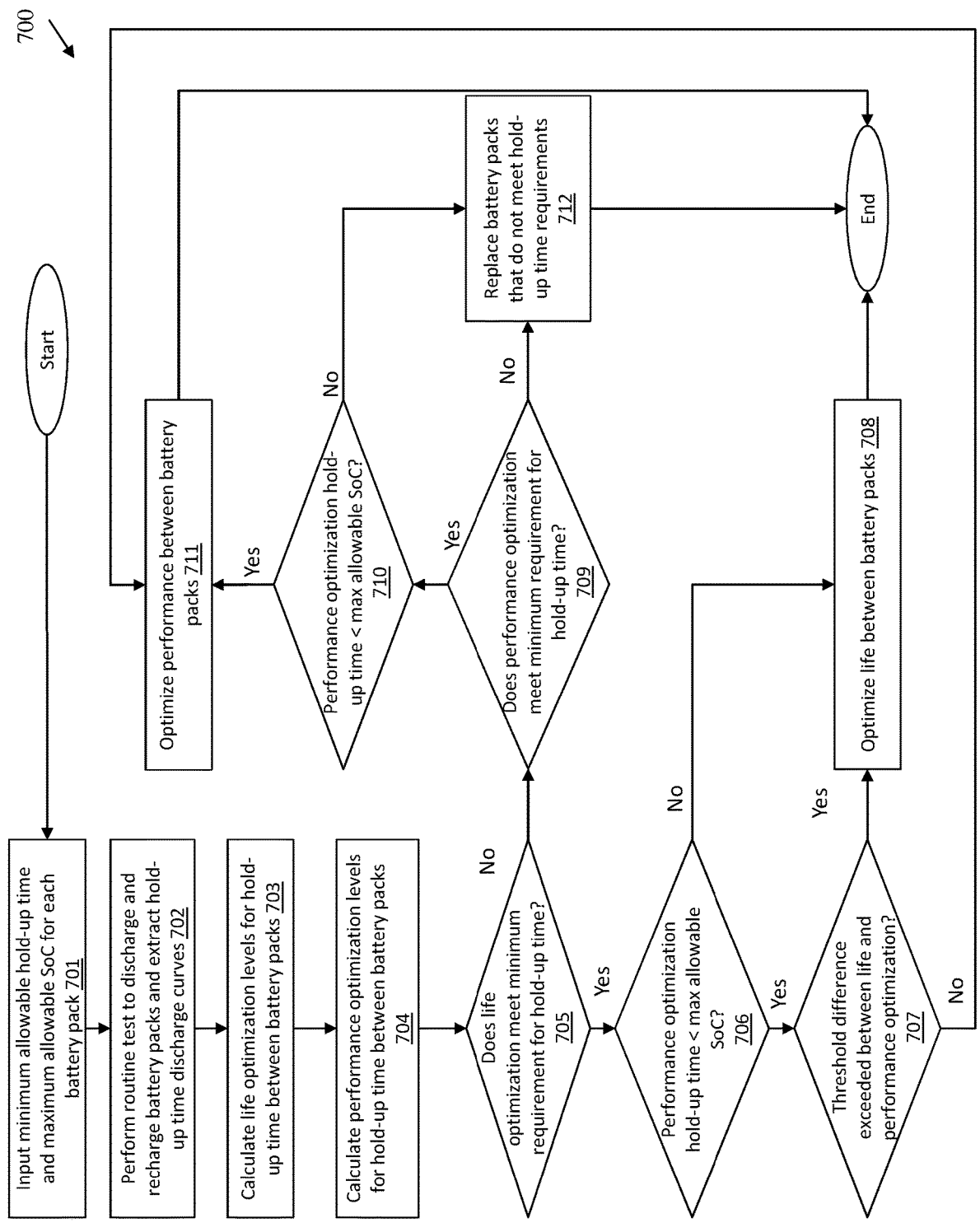
FIG. 7 depicts a flow diagram of a method for determining a performance characteristic for battery pack management according to one or more embodiments of the present invention.

FIG. 7 depicts a flow diagram of a method for determining a performance characteristic for battery pack management according to one or more embodiments of the present invention. The method 700 beings at block 701 where a designer of a battery management system can input a minimum allowable hold-up time and a maximum allowable SoC for each battery pack. In some embodiments, a designer can choose to maintain a hold-up time of 8 minutes in the end product; however, the designer would not go above 75% SoC in order to minimize the chances of a thermal runaway event. The method 700 continues to block 702 to perform a routine test (e.g., weekly, monthly, etc.) to discharge and recharge battery packs and extract hold-up time discharge curves for each battery pack. At block 703, the method 700 calculates the life optimization levels for hold-up time between battery packs. And at block 704, the method 700 calculates the performance optimization levels for hold-up time between battery packs. At decision block 705, the method 700 determines if life optimization hold-up time meets a minimum requirement set at block 701 by the designer. In some embodiments, the minimum requirement can be set by any person including, but not limited, designer, manufacturer, or user. If the life optimization hold-up time meets the minimum requirement (e.g., "yes" branch from block 705), the method 700 continues to decision block 706 to determine if the performance optimization hold-up time is less than the maximum allowable SoC for all the battery packs. If the performance optimization hold-up time is less than the maximum allowable SoC for all the battery packs (e.g., "yes" branch from block 706), the method 700 continues to decision block 707 to determine if a threshold difference is exceeded between life and performance optimization. In some embodiments, the threshold difference may be product dependent. For example, a designer may set a threshold difference value such as 5 seconds. If the threshold difference is not exceeded between life and performance optimization (e.g., "no" branch from block 707), the method 700 proceeds to block 711 to optimize performance of the end product before ending. If the difference between life and performance optimizations are small, the method 700 chooses to optimize performance in the end product to get a few extra seconds of hold-up time because this does not significantly impact the life of the weaker battery packs. If the threshold difference is exceeded between life and performance optimization (e.g., "yes" branch from block 707) or if the performance optimization hold-up time is greater than the maximum allowable SoC for all the battery packs (e.g., "no" branch from block 706), the method 700 proceeds to block 708 to proceed with optimizing the life of the battery packs before ending. If there is a large difference greater than the threshold (e.g., 5 seconds), there may be too much risk to eventually having to replace batteries in the future if performance optimization was chosen so the method 700 can default to life optimization since that is above the minimum allowable hold-up time. If the life optimization hold-up time does not meet the minimum requirement (e.g., "no" branch from block 705), the method 700 continues to decision block 709 to determine if performance optimization hold-up time meets the minimum requirement. If performance optimization hold-up time does meet the minimum requirement (e.g., "yes" branch from block 709), the method 700 proceeds to decision block 710 to determine if the performance optimization hold-up time is less than the maximum allowable SoC for all the battery packs. If the performance optimization hold-up time is greater than the maximum allowable SoC for all the battery packs (e.g., "no" branch for block 710) or if performance optimization hold-up time does not meet the minimum requirement (e.g., "no" branch for block 709), the method 700 proceeds to block 712 to initiate a replacement of battery packs that do not meet minimum hold-up time requirements before ending. If the performance optimization hold-up time is less than the maximum allowable SoC for all the battery packs (e.g., "yes" branch for block 710), the method 700 proceeds to block 711 to optimize performance between battery packs before ending since that is the only option remaining at this point before battery packs will need to be replaced.

Additional processes may also be included. It should be understood that the processes depicted in FIG. 7 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The non-transitory computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for battery pack management, the method comprising:
   receiving battery pack data for two or more battery packs, the two or more battery packs comprising a first battery pack and a second battery pack;
   determining a target performance characteristic for the first battery pack and the second battery pack;
   determining a first hold up time for the first battery pack and a second hold up time for the second battery pack based at least in part on the battery pack data;
   determining, based on the target performance characteristic, a target hold up time from the first hold up time and the second hold up time;
   determining, based on the battery pack data, a first voltage for the first battery pack and a second voltage for the second battery pack that satisfies the target hold up time;
   charging, utilizing a power supply, the first battery pack to the first voltage; and
   charging, utilizing the power supply, the second battery pack to the second voltage, wherein the target performance characteristics comprises battery pack life optimization and battery pack performance optimization; and
   wherein determining the target performance characteristic for the first battery pack and the second battery pack comprises:
      determining whether the first hold up time and second hold up time are above a threshold life optimization hold up time;
      determining a performance optimization hold-up time for the first battery pack and the second battery pack;
      determining whether a state of charge for the performance optimization hold-up time exceeds a maximum allowable state of charge;
      determining whether a difference between the performance optimization hold up time and the life optimization hold up time exceeds a threshold difference; and
      selecting battery pack life optimization for the target performance characteristic based on determining that the first hold up time and second hold up time are above the threshold life optimization hold up time and the state of charge for performance optimization hold up time exceeds the maximum allowable state of charge.

2. The method of claim 1, wherein determining the target performance characteristic for the first battery pack and the second battery pack further comprises:
   selecting battery pack life optimization for the target performance characteristic based on determining that the first hold up time and second hold up time are above the threshold life optimization hold up time, the state of charge for performance optimization hold up time does not exceed the maximum allowable state of charge, and the difference between the performance optimization hold up time and the life optimization hold up time exceeds the threshold difference.

3. The method of claim 1, wherein determining the target performance characteristic for the first battery pack and the second battery pack further comprises:
   selecting battery pack performance optimization for the target performance characteristic based on determining that the first hold up time and second hold up time are above the threshold life optimization hold up time, the state of charge for performance optimization hold up time does not exceed the maximum allowable state of charge, and the difference between the performance optimization hold up time and the life optimization hold up time does not exceed the threshold difference.

4. The method of claim 1, wherein determining the target performance characteristic for the first battery pack and the second battery pack further comprises:
   determining whether the first hold up time and second hold up time are above a threshold performance optimization hold up time;
   selecting battery pack performance optimization for the target performance characteristic based on determining that the first hold up time and second hold up time are not above the threshold life optimization hold up time, the first hold up time and second hold up time are above a threshold performance optimization hold up time, and the state of charge for performance optimization hold up time does not exceed the maximum allowable state of charge.

5. The method of claim 1, wherein the target performance characteristic comprises battery pack life optimization; and
wherein determining the target hold up time comprises identifying and selecting a lowest hold up time from the first hold up time and the second hold up time.

6. The method of claim 1, wherein the target performance characteristic comprises battery pack performance optimization; and
wherein determining the target hold up time comprises identifying and selecting a highest hold up time from the first hold up time and the second hold up time.

7. The method of claim 1, wherein the battery pack data comprises historical battery discharge curves associated with the two or more battery pack.

8. The method of claim 7, wherein the historical battery discharge curves are determined by measuring a discharge time and corresponding voltages associated with each of the two or more battery packs.

9. The method of claim 7, wherein the determining the first voltage for the first battery pack and the second voltage for the second battery pack comprises:
discharging the first battery pack and the second battery pack;
measuring a first hold up time for the first battery pack;
measuring a second hold up time for the second battery pack;
comparing the first hold up to the target hold up time to determine a first difference value; and
determining that the first difference value exceeds a threshold difference value, analyzing a first historical battery discharge curve associated with the first battery pack to determine the first voltage for the first battery pack, wherein the first voltage corresponds to the target hold up time based on the first historical battery discharge curve.

10. The method of claim 9, wherein the determining the first voltage for the first battery pack and the second voltage for the second battery pack further comprises:
comparing the second hold up to the target hold up time to determine a second difference value; and
determining that the second difference value exceeds a threshold difference value, analyzing a second historical battery discharge curve associated with the second battery pack to determine the second voltage for the second battery pack, wherein the second voltage corresponds to the target hold up time based on the second historical battery discharge curve.

11. A system for battery pack management, the system comprising:
a processor communicatively coupled to a memory, the processor configured to:
receive battery pack data for two or more battery packs, the two or more battery packs comprising a first battery pack and a second battery pack;
determine a target performance characteristic for the first battery pack and the second battery pack;
determine a first hold up time for the first battery back and a second hold up time for the second battery pack based at least in part on the battery pack data;
determine, based on the target performance characteristic, a target hold up time from the first hold up time and the second hold up time;
determine a first voltage for the first battery pack and a second voltage for the second battery pack that satisfies the target hold up time based on the battery pack data;
charge, utilizing a power supply, the first battery pack to the first voltage; and
charge, utilizing the power supply, the second battery pack to the second voltage, wherein the target performance characteristics comprises battery pack life optimization and battery pack performance optimization; and
wherein determining the target performance characteristic for the first battery pack and the second battery pack comprises:
determining whether the first hold up time and second hold up time are above a threshold life optimization hold up time;
determining a performance optimization hold-up time for the first battery pack and the second battery pack;
determining whether a state of charge for the performance optimization hold-up time exceeds a maximum allowable state of charge;
determining whether a difference between the performance optimization hold up time and the life optimization hold up time exceeds a threshold difference; and
selecting battery pack life optimization for the target performance characteristic based on determining that the first hold up time and second hold up time are above the threshold life optimization hold up time and the state of charge for performance optimization hold up time exceeds the maximum allowable state of charge.

12. The system of claim 11, wherein determining the target performance characteristic for the first battery pack and the second battery pack further comprises:
selecting battery pack life optimization for the target performance characteristic based on determining that the first hold up time and second hold up time are above the threshold life optimization hold up time, the state of charge for performance optimization hold up time does not exceed the maximum allowable state of charge, and the difference between the performance optimization hold up time and the life optimization hold up time exceeds the threshold difference.

13. A non-transitory computer program product for battery pack management comprising a computer readable storage medium having program instructions embodied therewith, the program instructions executable by a processor to cause the processor to perform operations comprising:
receiving battery pack data for two or more battery packs, the two or more battery packs comprising a first battery pack and a second battery pack;
determining a target performance characteristic for the first battery pack and the second battery pack;
determining a first hold up time for the first battery back and a second hold up time for the second battery pack based at least in part on the battery pack data;
determining, based on the target performance characteristic, a target hold up time from the first hold up time and the second hold up time;
determining a first voltage for the first battery pack and a second voltage for the second battery pack that satisfies the target hold up time based on the battery pack data;
charging, utilizing a power supply, the first battery pack to the first voltage; and
charging, utilizing the power supply, the second battery pack to the second voltage, wherein the target performance characteristics comprises battery pack life optimization and battery pack performance optimization; and wherein determining the target performance characteristic for the first battery pack and the second battery pack comprises:
determining whether the first hold up time and second hold up time are above a threshold life optimization hold up time;
determining a performance optimization hold-up time for the first battery pack and the second battery pack;
determining whether a state of charge for the performance optimization hold-up time exceeds a maximum allowable state of charge;
determining whether a difference between the performance optimization hold up time and the life optimization hold up time exceeds a threshold difference; and
selecting battery pack life optimization for the target performance characteristic based on determining that the first hold up time and second hold up time are above the threshold life optimization hold up time and the state of charge for performance optimization hold up time exceeds the maximum allowable state of charge.

14. The computer program product of claim 13, wherein determining the target performance characteristic for the first battery pack and the second battery pack further comprises:
selecting battery pack life optimization for the target performance characteristic based on determining that the first hold up time and second hold up time are above the threshold life optimization hold up time, the state of charge for performance optimization hold up time does not exceed the maximum allowable state of charge, and the difference between the performance optimization hold up time and the life optimization hold up time exceeds the threshold difference.

* * * * *